Jan. 26, 1960 B. A. COUSINO 2,922,642

TAPE CARTRIDGE

Filed Jan. 22, 1957 3 Sheets-Sheet 1

INVENTOR

*Bernard A. Cousino*

BY *McCoy, Greene & TeGrotenhuis*

ATTORNEYS

Jan. 26, 1960 B. A. COUSINO 2,922,642

TAPE CARTRIDGE

Filed Jan. 22, 1957 3 Sheets-Sheet 2

INVENTOR

*Bernard A. Cousino*

BY McCoy, Greene & TeGrotenhuis

ATTORNEYS

INVENTOR
Bernard A. Cousino
BY McCoy, Greene & TeGrotenhuis
ATTORNEYS

United States Patent Office 2,922,642

Patented Jan. 26, 1960

2,922,642

TAPE CARTRIDGE

Bernard A. Cousino, Toledo, Ohio

Application January 22, 1957, Serial No. 635,308

13 Claims. (Cl. 271—2.18)

The present invention relates to means for preventing disarrangement of tape on a reel and more particularly to brake means for preventing rotation of a reel and the tape coil thereon when the reel is not in use so that the tape may be stored in an orderly manner within a magazine.

Difficulty has been had in storing magnetic tape in magazines of the type disclosed in my copending application, Serial No. 500,633, filed April 11, 1955, now Patent No. 2,911,215, since the loop of tape extending from the reel sometimes becomes disarranged due to jarring of the magazine particularly in moving vehicles.

According to the present invention, brake means is provided for preventing movement of the reel and the tape coil within the magazine when the magazine is not in use. Such brake means engages the top of the tape coil to prevent rotation of the coil and the reel and has means accessible from outside the magazine for releasing the brake when it is desired to feed the tape from the reel. The brake may be released in response to movement of the magazine to its operating position on the tape recorder or may be released by cam means, or the like, just before feeding of the tape is effected.

Where means are provided for causing relative upward and downward movement of one of the tape feed rollers and a portion of the tape, as disclosed in said Patent No. 2,911,215, a common control member may be provided for causing such relative movement and for releasing the brake from the coil.

The brake and the upper surfaces of the tape coil normally are in engagement so that the tape in the coil is held effectively against movement. A spring, or the like, may be provided for pressing a brake member downwardly against the tape coil or for pressing the coil upwardly against a brake member. Braking the reel alone without engaging the tape coil reduces tape movement but is generally unsatisfactory since it does not effectively prevent movement of the coil due to jarring or vibration of the magazine.

An object of the present invention is to provide a magazine which holds magnetic tape in orderly storage.

A further object of the invention is to provide means for preventing the rotation of a tape coil within a magazine so that the tape may be accurately positioned for insertion into a tape recording and/or reproducing device.

Other objects, uses and advantages of the present invention will become apparent to those skilled in the art from the following description and claims and from the drawings, in which:

Figures 8, 9, 10:
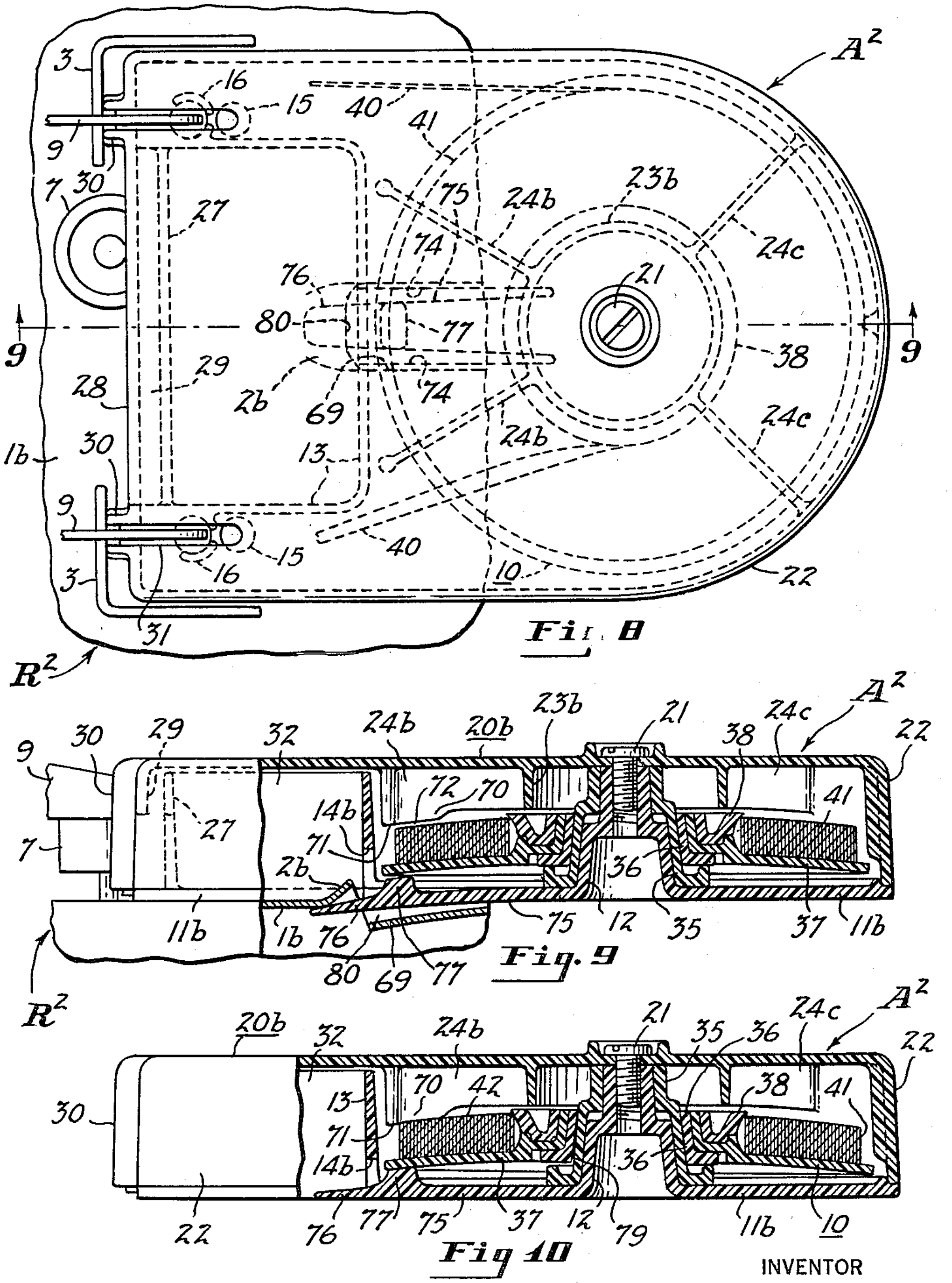
Figure 8 is a top plan view similar to Fig. 1, with parts omitted, showing a modified form of tape recording and reproducing device and a modified form of cartridge constructed according to the present invention, the parts being shown in their positions during feeding of the tape past the magnetic head.

Figure 9 is a fragmentary side elevational view with parts omitted and with parts broken away and shown in a vertical section taken substantially along the line indicated at 9—9 in Fig. 8, the magazine being shown in its normal operating position with the brake released to permit feeding of the tape; and Figure 10 is a side elevational view with parts broken away and shown in a vertical section taken substantially along the line 9—9 of Fig. 8, the parts being shown in their normal positions when the magazine is removed from the tape recorder and the coil is held securely in place by the brake.

Figure 1:
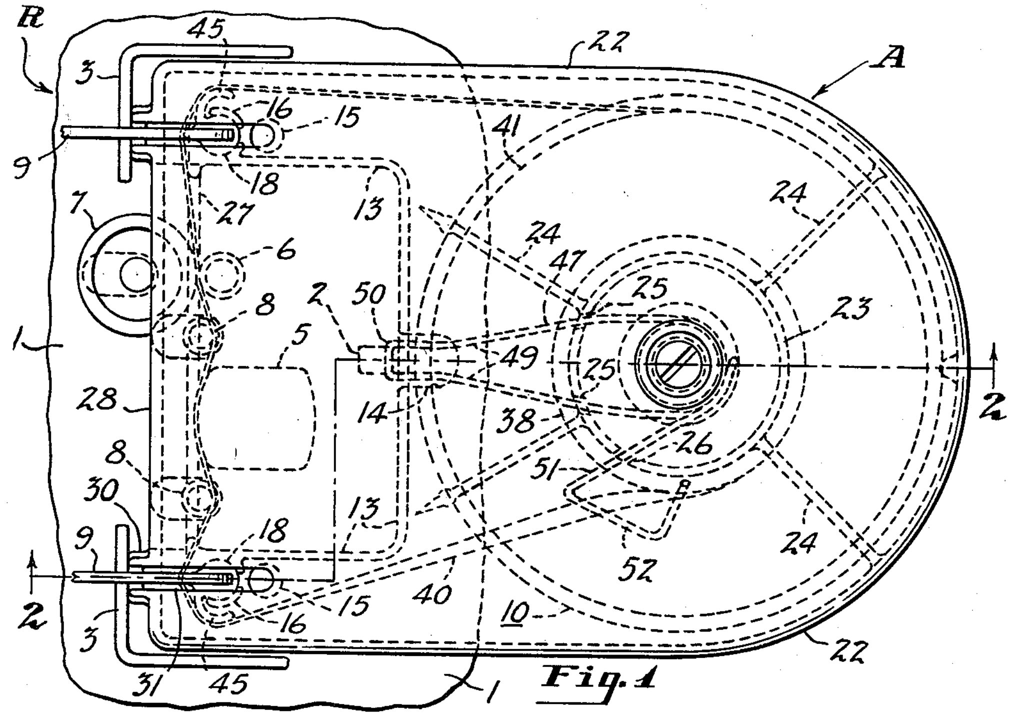
Figure 1 is a top plan view, with parts omitted and parts broken away, of a tape recording and reproducing device and a removable magazine constructed according to the present invention, the parts being shown in their operating positions during feeding of the tape.
Figures 2, 3:
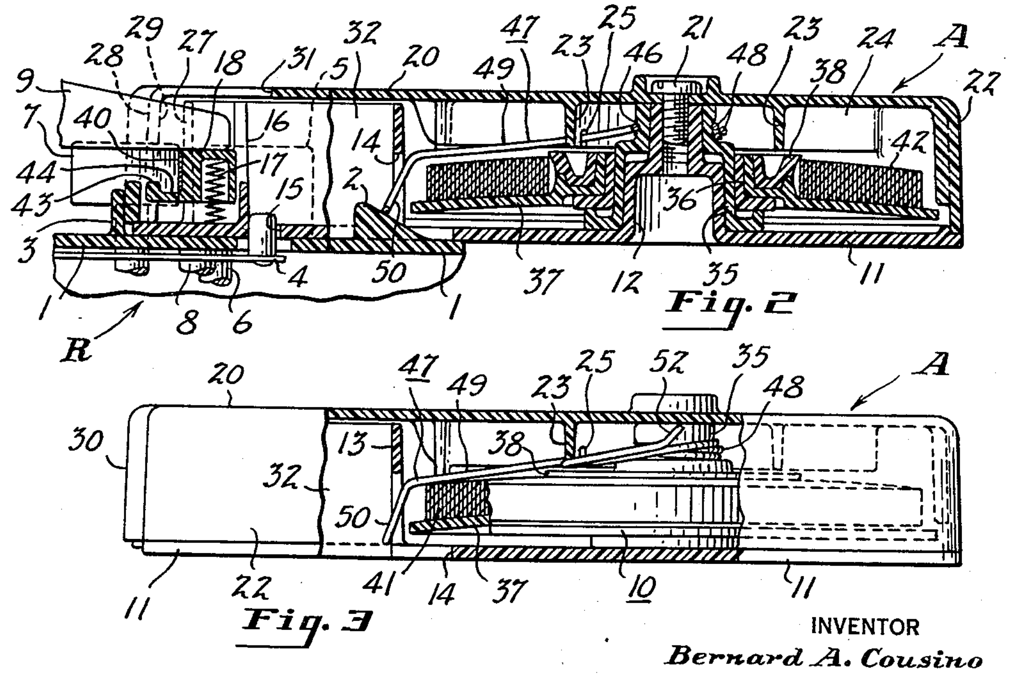
Figure 2 is a vertical sectional view taken substantially on the line indicated at 2—2 in Fig. 1, and on the same scale, with parts omitted, the magazine being shown in its normal operating position with the brake released to permit feeding of the tape.
Figure 3 is a side elevational view of the magazine of Figs. 1 and 2 on the same scale, with parts omitted and parts broken away and shown in vertical cross section, the brake being shown in its locking position in engagement with the tape coil.

Referring more particularly to the drawings which are drawn substantially to scale and in which like parts are identified by the same numerals throughout the several views, Figures 1 and 2 show a tape recording and reproducing device R, which is almost the same as that disclosed in said Patent No. 2,911,215. The machine R has a top plate 1 with a smooth flat horizontal upper surface for guiding each magazine to an operating position. Said top plate has a tapered upwardly projecting cam portion 2 which releases the brake, as will be hereinafter described. A pair of L-shaped magazine guides 3 are mounted in alignment on the plate 1 to provide vertical surfaces for guiding each magazine to an operating position and for limiting the forward movement of said magazine. A pair of releasable magazine latches 4 are provided below the plate 1 having magazine-engaging portions projecting upwardly through holes in the plate 1. A conventional magnetic head 5 is mounted on the plate 1 and projects a short distance above said plate as best shown in Fig. 2. Means are provided for feeding the tape past the magnetic head including a motor-driven drive roller or capstan 6 having a fixed vertical axis and a rubber-covered idler roller 7 mounted for horizontal movement toward and away from the capstan, said idler preferably being pressed against the capstan by a spring to avoid excessive pressure on the tape.

As herein shown a pair of grooved guide pins 8 extend upwardly through slots in the plate 1, said guide pins being mounted for movement toward and away from the magnetic head 5 in unison with the idler roller 7 and being located so as to hold the tape against the curved vertical face of the magnetic head 5 during feeding of the tape, as best shown in Fig. 1. A pair of tape-depressing fingers 9 are provided for lowering the tape between the feed rollers 6 and 7 and between the magnetic head 5 and the guide pins 8. The fingers 9 may be moved vertically by the same control member which effects horizontal movement of the roller 7 and the pins 8, for example as disclosed in said Patent No. 2,911,215.

The tape recording and reproducing device R is constructed to receive a magazine A containing a reel 10, or any other suitable endless tape reel of the type disclosed in said Patent No. 2,911,215, and in my copending application, Serial No. 535,899, filed September 22, 1955, now abandoned.

The magazine A has a bottom portion 11 with a flat bottom surface for slidably engaging the flat upper surface of the plate 1. Said bottom portion includes an annular upwardly projecting stud portion 12 for locating the reel 10 and continuous vertical walls 13 of U-shaped horizontal cross section defining a recess 32 for receiving the magnetic head and the capstan. The walls 13 and the bottom horizontal portion of the magazine are provided with a slot 14 midway between the sides of the magazine, similar to the slot provided in the magazines of said copending applications, Serial No. 500,633, now Pat. No. 2,911,215, and Serial No. 535,899, now abandoned, which receives the optional reel-driving roller.

Laterally aligned circular holes 15 are provided at opposite sides of the rectangular front portion of the magazine A to receive the vertically projecting portions of the latches 4, as best shown in Fig. 2. A pair of vertical guide posts 16 extend upwardly from the bottom portion 11 near the front corners of the magazine to assist in guiding the tape to and from the reel 10. These guide posts have vertical bores for receiving the helical springs 17 and for receiving portions of the nylon tape guides 18, which are improved versions of the guides shown in Figs. 18 to 21 of said Patent No. 2,911,215. The springs 17 normally hold the guides 18 in an upper position wherein the magnetic tape is completely enclosed within the magazine, the posts 16 serving to guide the members 18 vertically as they are moved by the fingers 9 or the springs 17.

The magazine A has a cover 20 which is almost identical with the cover of the magazine $A^2$ shown in said Patent No. 2,911,215, said cover being rigidly held in engagement with the bottom portion 11 by means of a screw 21. The cover 20 has a flat horizontal upper surface and a marginal skirt 22 extending downwardly from said surface. The cover has downwardly projecting portions forming an annular flange 23 concentric to the stud portion 12 and radial flanges 24 that closely overlie the tape on the reel 10. Two of the flanges 24 are provided with symmetrically arranged wire-receiving slots 25, and one of these flanges is provided with a similar wire-receiving slot 26 as shown in Figs. 1 and 2.

The front rectangular portion of the cover 20 has a pair of straight horizontal portions 27 and 28 near the top of the magazine extending across the recess 32 defined by the walls 13, said straight portions being located in parallel vertical positions to provide a straight slot 29 for receiving a portion of the tape when the guides 18 are in their uppermost positions. Forwardly of the guides 18, the cover 20 is provided with forwardly projecting portions 30, said cover having large slots 31 therethrough extending vertically below the tape slot 29 and horizontally beyond the tape guides 18 as shown in Figs. 1 and 2 so as to permit vertical swinging movement of the fingers 9 through the cover.

The magnetic head 5, the feed rollers 6 and 7, and the guide pins 8 have a vertical height less than the height of the bottom edges of the transverse portions 27 and 28 so that said transverse portions and the tape between said portions do not interfere with horizontal sliding movement of the magazine A on the plate 1 into and out of its normal operating position shown in Figs. 1 and 2. The recess 32 receives the elements 5 to 8 when the magazine is in its operating position, and the portion of the tape between the guides 18 is normally in the slot 29 above said recess so as to be completely enclosed by the magazine. The fingers 9 effect lowering of the guides 18 and moving of the tape from the upper position, wherein it is completely enclosed and protected, to a lower position wherein it is exposed in the recess 32 for engagement with the tape feeding and guiding elements 5 to 8.

The reel 10 is generally of the same type as shown in Figs. 29 and 30 of my copending application, Serial No. 631,199 filed December 28, 1956 and entitled "Endless Tape Reel." As shown in Fig. 2 the reel 10 is mounted for rotation on an annular nylon bearing 35 which engages the stud portion 12, and includes an annular nylon bearing sleeve 36 of L-shaped radial cross section, said bearing sleeve being fixed to the reel for rotation therewith. It is preferable to use two nylon bearing members, but good results can be obtained omitting the additional bearing sleeve as disclosed in said copending application, Serial No. 631,199 and said Patent No. 2,911,215.

The structure of the reel 10 should be apparent from Fig. 2 which is drawn to scale. This reel has a horizontal annular coil-supporting disc or plate 37 with a graphite-coated convex upper surface of curved radial cross section and has an annular axially tapered hub 38 with a concave annular groove of generally arcuate cross section for engaging the tape as it is pulled from the innermost coil convolution. Said concave groove may be symmetrical about the horizontal medial plane of the hub 38. A strip of graphite-coated magnetic sound tape 40, of uniform width and thickness, is wound around the hub 38 to form an endless tape coil 41 having a generally horizontal top surface 42 formed by the upper edges of the coil convolutions. The tape extends from the coil to provide a loop extending forwardly directly from the innermost coil convolution to one of the guides 18 at the front corner portion of the magazine, laterally directly to the guide 18 at the other front corner portion, and rearwardly directly to the outermost coil convolution.

The nylon guides 18 have forwardly projecting portions 43 below the tape in said loop for supporting the tape, each of said portions having a tape-receiving notch 44 as shown in Figs. 1 and 2, which are drawn to scale. Each guide 18 is similar to the guide 41*a* shown in said Patent No. 2,911,215, but has a tape-guiding skirt 45 of arcuate horizontal cross section. It is preferable to make the guides 18 of nylon so as to reduce the friction between the smoothly curved vertical surfaces of the skirt 45 and the tape. Said guides may also be coated with colloidal graphite. The guides 18 and the bearing members 35 and 36 are the only plastic parts made of nylon. The remainder of the magazine A, except for the metal springs 17 and the metal brake 47 are made of a cheaper plastic which may be readily molded.

According to the present invention, brake means are provided for holding the reel against rotation in the magazine. When the magazine is removed from the recorder R, as shown in Figs. 1 to 3, the magazine A is provided with a brake 47 formed by a small wire of circular cross section. The brake has a portion 48 spirally wound in an annular groove 46 at the top of the bearing member 35 to anchor the wire to the bearing member. The wire extends radially upwardly over the tape coil 41 and back to the bearing member 35 to form a loop including a horizontal portion 49 that normally engages the top surface 42 of the tape coil and an upright U-shaped brake-releasing portion 50 that is accessible from outside the magazine. Two radially extending wire legs of the portion 49 engage the bottoms of the notches 25 in the cover 20. A wire leg 51 extends radially from the spirally wound portion 48 and fits in the notch 26. An L-shaped guide portion 52 is formed at the end of the arm 51 and engages the top of the cover 20 as shown in Fig. 3, the tape leaving the innermost convolution of the coil engaging the top surface of the longer portion of the element 52 which serves as a guide for the tape, as shown in Fig. 1.

The operation of the brake 47 should be apparent from the Figs. 1, 2 and 3. The flange portion 23 engages the horizontally extending wire portions 49 at the notches 25 so that the portions 49 are normally held in engagement with the supper surface 42 of the coil as shown in Fig. 3, whereby the coil 41 is pressed downwardly against the plate 37 and held against rotation. By engaging the coil 41 the brake 47 also seves as means for holding the reel 10 against rotation. When the magazine is slid horizontally on the plate 1 to its normal operating position, shown in Figs. 1 and 2, the horizontal wire portion of the brake releasing member 50 rides up the inclined surface of the stationary cam member 2 whereby the horizontal portion 49 is lifted vertically out of engagement with the coil 41 as shown in Fig. 2. The reel 10 and the coil 41 are, therefore, free to rotate whenever the magazine A is in its normal operating position on the recorder R.

The wire portions 49 are resilient so that they spring back into contact with the top of the coil 41 whenever the magazine is removed from the recorder R, as shown in Fig. 3. The flange 23 exerts sufficient pressure on the portions 49 to insure that the brake 47 will effectively hold the coil against rotation. It is, therefore, almost impossible to disturb the tape within the magazine A by normal handling of the magazine. The brake 47 functions most effectively when it engages a substantial number of coil convolutions and will not damage the tape even where it applies a substantial pressure against the top edges of the tape.

It would be possible to rotate the reel 10 when the magazine is in its operating position even though the feed rollers 6 and 7 are not in engagement with the tape. However, this would be extremely difficult in a magazine of the type shown herein since the magazine is tamper-proof (that is, it completely encloses the tape) and since the magazine cannot move relative to the recorder R when it is held in place by the latches 4. Since jarring of the recorder R would be unlikely except in an automobile, the construction shown in Figs. 1 to 3 is excellent for most purposes. However, the machine can be designed so that the brake is released only as the feed rollers are moved into engagement with the tape.

Figures 4, 5, 6, 7:
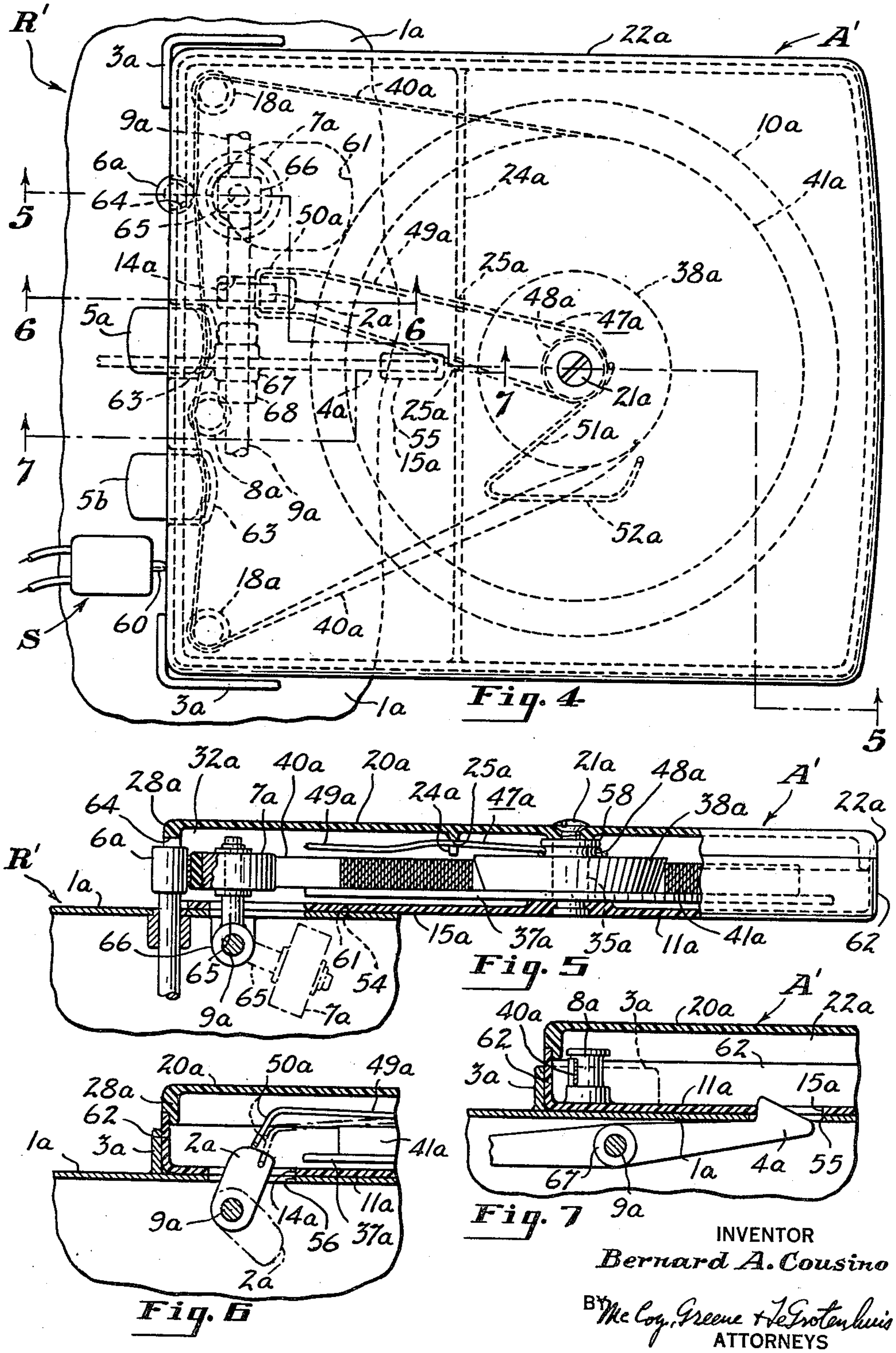
Figure 4 is a top plan view similar to Fig. 1 and on the same scale, showing a modified form of tape recording and reproducing device and a modified form of cartridge constructed according to the present invention, the parts being shown in their positions during feeding of the tape.
Figure 5 is a fragmentary vertical sectional view with parts omitted, taken substantially along the line indicated at 5—5 in Fig. 4, and on the same scale, the vertically swinging idler roller being shown in dot-dash lines in its lower retracted position.
Figure 6 is a fragmentary vertical sectional view with parts omitted, taken substantially along the line indicated at 6—6 in Fig. 4, the brake being shown in solid lines in its released position during feeding of the tape, and being shown in dot-dash lines in its normal locking position in engagement with the top of the tape coil.
Figure 7 is a fragmentary vertical sectional view with parts omitted, taken substantially on the line indicated at 7—7 in Fig. 4, and on the same scale, to show how the latch holds the magazine in its operating position.

Figures 4 to 7 illustrate a modified form of the invention, which employs this principle. These figures show a tape recording and reproducing device R′ having a horizontal top plate 1a with a flat horizontal upper surface for slidably engaging and guiding the magazine to an operating position. A pair of L-shaped magazine guides 3a similar to the guides 3 of the recorder R are provided to guide each magazine to an operating position as shown in Fig. 4 and to limit forward movement of the magazine. The recorder R has a brake releasing cam 2a and has a releasable magazine latch 4a that holds the magazine in its operating position.

A pair of laterally aligned magnetic transducer heads 5a and 5b are mounted on the plate 1a, and means are provided for feeding the tape over said heads, including a motor driven drive roller or capstan 6a having a fixed vertical axis and a rubber-covered idler roller 7a having an axis of rotation that may have different positions. A conventional on-off switch S is mounted on the plate 1a and has an outwardly projecting operating plunger 60 for engaging each magazine as it is moved to its operating position. The switch S makes and breaks the electrical connection between the electric driving motor for the capstan 6a and its source of energy. The switch S is open when there is no magazine on the recorder R′ and is closed by the plunger 60 whenever the magazine is in its operating position as shown in Fig. 4. This arrangement is advantageous since driving of the capstan 6a continuously wastes a great amount of electricity when there is no magazine on the recorder.

Like the form of the invention shown in Figs. 1 to 3, the device of Figs. 4 to 7 has means for causing relative vertical movement between the tape and one feed roller so that said one feed roller does not interfere with movement of the magazine to and from its operating position. In the first described form of the invention, this relative movement is effected by means including the fingers 9 and the spring 17. In the modified form this relative vertical movement is effected by means including the shaft 9a and control means (not shown) for rotating said shaft. The shaft 9a is journaled in suitable bearings for rotation about a horizontal transverse axis spaced a fraction of an inch below the top plate 1a and is rigidly connected to the brake release cam 2a so as to effect movement of said cam from a retracted position shown in dot-dash lines in Fig. 6 to an advanced upper position shown in solid lines in that figure. The top plate 1a of the recorder R′ has a large oblong opening 54 to permit swinging of the idler 7a from a position below the plate 1a, as shown in dot-dash lines in Fig. 5, to an operating tape-engaging position as shown in solid lines in that figure.

The plate 1a also has an opening 55 for receiving the upwardly-projecting magazine-engaging portion of the latch 4a and has an opening 56 to permit upward movement of the cam 2a to a brake-releasing position.

The idler roller 7a is mounted for rotation on a shaft 65 having a boss 66 rigidly mounted on the shaft 9a. The latch 4a has a boss 67 which is loosely mounted on the shaft 9a so that the latch does not move when the shaft 9a is rotated, collars 68 being rigidly mounted on said shaft on opposite sides of the boss 67 to prevent axial movement of said boss.

Recorder R′ is designed to receive a magazine A′ having an endless tape reel 10a mounted therein for rotation about a vertical axis. The magazine A′ is of generally rectangular shape and has a bottom plastic portion 11a with a flat bottom surface for slidably engaging the flat upper surface of the plate 1a. The bottom portion 11a has means defining a large oblong opening 61 of the same size as the opening 54, that registers with the latter opening when the magazine is in its operating position, shown in Figs. 4 to 7, so that the idler roller 7a may be swung vertically to its tape feeding position within the magazine. The bottom 11a also has means defining an opening 14a that registers with the opening 56 to receive a cam 2a and means defining an opening 15a that registers with the opening 55 to receive the latch 4a.

Means are provided for guiding a straight portion of the tape between the front corner portions of the magazine A′ including an annular nylon tape guide 8a having annular tape-receiving grooves, with a width corresponding to that of the tape, for locating the tape vertically and having similar nylon tape guides 18a at the front corners of the magazine. The guide 8a serves as means for holding the tape against the magnetic heads 5a and 5b when the magazine is in its operating position, it being apparent that such guide may be replaced by a spring finger or similar means for yieldably pressing the tape against the magnetic heads.

The magazine A′ is provided with a plastic cover 20a of rectangular shape that fits on the bottom portion 11a in such a manner that the magazine is completely closed at its top, bottom, rear, and side walls, the cover 20a being rigidly held on the bottom portion 11a by means of a screw 21a which fits in the upper end portion of the external cylindrical metal stud 35a. This stud is rigidly mounted on the bottom portion 11a and has a diameter corresponding to that of the internal cylindrical surface of the reel 10a so as to provide a bearing for the reel. The cover 20a has a downwardly projecting continuous marginal skirt 22a extending around the sides and rear of the magazine and a vertical skirt portion 28a extending laterally and engaging the laterally extending portions of the guides 3a.

The cover also has a downwardly projecting lateral flange 24a which functions like the radial flanges 24 of the magazine A to limit upward movement of the tape within the magazine, said flange 24a having wire-receiving notches 25a similar to the notches 25 described above. A recess 32a is provided in the front portion of the magazine A' to receive the tape, the feed rollers, and the front portions of the magnetic heads.

The bottom portion 11a of the magazine has an upwardly projecting marginal skirt 62 which fits with the skirts 22a and 28a on the cover 20a so as to completely close the marginal side walls of the magazine, except for the openings 63 and 64 at the front of the magazine. One opening 64 is provided to permit the capstan 6a to enter the recess 32a as the magazine A' is moved horizontally to its operating position, and two larger openings 63 are provided to permit movement of the heads 5a and 5b into said recess 32a during such movement. The tape 40a within the magazine A' is, therefore, almost completely enclosed within the magazine so that it cannot readily be disturbed by one handling the magazine.

The reel 10a is somewhat larger than the reel 10 described above and comprises a flat circular disc or plate 37a and a frusto-conical hub 38a integral with said disc and increasing in diameter in a direction away from said disc. The tape 40a is spirally wound on the hub 38a to form a flat coil, a portion of the tape forming a loop extending from the innermost coil convolution around the guides 18a and 8a and back to the outermost coil convolution as shown in Fig. 4.

The magazine A' has a resilient wire of circular cross section bent to provide a brake 47a and a tape guide in a manner quite similar to that described with regard to the magazine A. The brake has a portion 48a spirally wound in the annular groove of a collar 58 mounted on the bearing member 35a to anchor the wire to said bearing member. The wire is bent to form a loop including a horizontal portion that normally engages the top surface of the tape coil 41a and an upright U-shaped brake-releasing portion 50a that is accessible from outside the magazine. Two radially extending wire legs of the portion 49a engage the bottoms of the notches 25a in the flange 24a. A wire leg 51a extends radially from the spirally wound portion 48a, and an L-shaped guide portion 52a is formed at the end of the arm 51a that has an end edge engaging the top of the cover 20a.

When it is desired to operate the recorder R', a magazine A' is slid on the plate 1a between the guides 3a to the operating position, as shown in Figs. 4 to 6. During the latter part of this movement, the flange 62 at the front of the magazine engages the plunger 60 to close the switch S and to start the capstan motor whereby the capstan 6a is caused to rotate continuously. At this time the cam 2a and the idler roller 7a are below the plate 1a, as shown in dot-dash lines in Figs. 5 and 6, and the latch 4a engages the forward edge of the opening 15a to prevent movement of the magazine out of its operating position.

If it is desired to remove the magazine, the latch 4a may be released by pivoting the latch on the shaft 9a and the magazine may be slid on the surface of the plate 1a away from the magnetic heads, in which case the plunger 60 will automatically move upwardly to open the switch S and to stop the capstan motor. If it is desired to record or play back music or the like, while the magazine is in its operating position, a control knob may be moved to rotate the shaft 9a, causing the idler roller 7a to swing vertically to a tape-feeding position in engagement with the tape as shown in Fig. 5.

The tape does not feed during rotation of the capstan 6a until it is pressed against said capstan by the roller 7a. Since the cam 2a has the position shown in Fig. 6 when the idler is in its tape feeding position, brake 47 is released and the reel 10a is free to rotate at the instant feeding of the tape is initiated. Whenever such feeding is stopped by moving the idler roller 7a out of engagement with the capstan 6a, the cam 2a is moved below the plate 2a and out of engagement with the brake-releasing portion 50a to effect stopping of the tape movement, the wire portions 49a springing back against the top of the coil 41a as shown in dot-dash lines in Fig. 6. The brake 47a, therefore, functions substantially the same as the brake 47 described above except that it is released in response to initiation of the tape feed rather than in response to movement of the magazine to its operating position.

In the magazines A and A', the spring finger normally presses down against the tape coil to hold the coil against movement. It will be understood, however, that the tape coil may also be held against movement by pressing the reel upwardly to hold the coil against a stationary brake member carried by the cover.

Figures 8 to 10 show a modified form of the invention wherein the reel is normally pressed upwardly to grip the tape coil. These figures show a tape recording and reproducing device $R^2$ having a horizontal top plate 1b with a flat horizontal upper surface for slidably engaging the magazine. The plate 1b has a depressed portion 69 and a cam portion 2b which, like the cam portion 2, serves to release the brake. The recorder $R^2$ is identical to the recorder R described above, except for the top plate 1b, and has the same means for guiding the magazine and for controlling and feeding the tape. The tape recording device $R^2$ is constructed to receive a plastic magazine $A^2$ containing a reel 10, or any other suitable endless tape reel.

The front portion of the magazine $A^2$ containing the tape guides, is identical to the front portion of the magazine A, and the means provided in the magazine $A^2$ for rotatably supporting the reel 10 are identical to those provided in the magazine A.

The bottom portion of the magazine $A^2$ is the same as that of the magazine A, except that the plastic bottom wall 11 is replaced with a plastic bottom wall 11b shaped to provide a resilient spring finger and brake and the slot 14 is replaced by a shorter slot 14b having the same size as the upper portion of the slot 14.

The magazine $A^2$ has a cover 20b which is identical to the cover 20 except that the annular flange 23 and the radial flanges 24 are replaced by an annular flange 23b and radial flanges 24b and 24c. The flange 23b is concentric to the bearing member 35 and extends downwardly almost to the top of the hub member 38. The flanges 24b and 24c extend radially outwardly from the flange 23b and have arcuately curved bottom surfaces parallel to the top surface 42 of the tape coil 41 for limiting the movement of the tape away from the convex upper surface of the coil-supporting plate 37. Each of the radial flanges 24b has a downwardly projecting brake portion 70 with an arcuately curved coil-engaging bottom surface 71 parallel to the surface 42.

During feeding of the tape, the surface 71 is spaced a small fraction of an inch from the upper surface 42 of the tape coil to provide a clearance 72 of a few hundredths of an inch as shown in Fig. 9. The brake portion 70, therefore, does not engage the tape 40 and does not interfere with feeding of the tape when the reel 10 is resting on the bearing member 35 in a position coaxial with said bearing member as shown in Fig. 9.

A pair of parallel narrow longitudinal slots 74 are provided in the plastic bottom wall 11b. These slots extend away from the recess 32, which receives the magnetic head and the capstan, so as to form an elongated spring finger 75 which extends from the stud 12 beyond the transverse portion of the wall 13. The spring finger has an end portion 76 of reduced thickness projecting beyond the wall 13 that provides a brake-releasing cam for engaging the inclined bottom surface of the cam member 2*b* and has an upwardly projecting brake portion 77 for engaging the bottom of the plate 37 near the margin thereof. The plastic forming the finger 75 has sufficient resilience so as yieldably to resist movement of the finger downwardly from its normal horizontal position shown in Fig. 10. The finger normally engages the reel 10 and presses the reel upwardly to hold the coil 41 against the stationary brake portions 70 whereby the coil is gripped and held against rotation relative to the cover 20*b*.

The bearing member 36 preferably has a loose fit on the bearing member 35 so as to minimize friction, and the engaging surfaces of the bearing members 35 and 36 preferably are tapered so that the reel may be tilted easily about a horizontal axis from the released position shown in Fig. 9 to the locked position shown in Fig. 10. A small clearance 79 is provided between a bearing member to permit the necessary tilting so that the finger 75 can hold the coil 41 against the flanges 24*b* to prevent movement of the reel and the tape.

As the magazine $A^2$ is slid on the upper plate 1*b* toward its normal operating position as shown in Fig. 8, the projecting portion 76 of the spring finger 75 enters the opening 80 between the portions 2*b* and 69, engages the portion 2*b*, and is forced downwardly by the inclined cam surface of said portion 2*b* to move the brake portion 77 of the spring finger out of engagement with the reel 10. The reel then drops to its normal position on the bearing member 35 and is free to rotate without interference by the brake members 70 and 77. The depressed portion 69 below the finger 75 provides a recess of a size to receive the finger as it is moved downwardly by the cam 2*b* out of engagement with the reel.

It is seen that the magazine $A^2$ functions generally like the first-described magazine A to release the brake automatically in response to movement of the magazine to its normal operating position on the tape recorder.

It will be understood that the above description is by way of illustration rather than limitation and that in accordance with the provisions of the patent statutes, variations and modifications of the specific devices disclosed herein may be made without departing from the spirit of the invention.

Having described my invention, I claim:

1. In a tape recording and/or reproducing device, the combination of a removable magazine, a reel mounted in said magazine for rotation about an upright axis, said reel having a generally horizontal coil-supporting plate and a central hub projecting above said plate, a strip of tape of substantially uniform width spirally wound around said hub to form a generally flat coil on said plate, releasable means for holding said magazine in a predetermined operating position, means for feeding the tape from said coil when said magazine is in said operating position, releasable brake means carried by said magazine and normally engaging said coil to prevent rotation thereof, and means for releasing said brake means when the magazine is in said operating position to permit rotation of said reel and feeding of said tape.

2. Apparatus as defined in claim 1 wherein the means for releasing said brake means operates in response to movement of the magazine to said operating position.

3. Apparatus as defined in claim 1 wherein means is provided outside the magazine and separate therefrom for releasing the brake means.

4. Apparatus as defined in claim 1 wherein the means for feeding the tape comprises a pair of feed members for engaging the opposite side faces of the tape to pull the tape from the coil, and common control means are provided for causing relative vertical movement of one of said feed members and a portion of the tape and for releasing said brake means, said relative vertical movement permitting movement of said portion of the tape horizontally over said one of said feed members as the magazine is moved to and from said operating position so that said portion of the tape does not interfere with movement of the magazine.

5. Apparatus as defined in claim 4 wherein said brake means normally engages the top edges of the coil convolutions to prevent movement of the coil relative to the magazine.

6. In a tape recording and/or reproducing device, the combination of a removable magazine; a reel mounted in said magazine for rotation about an upright axis, said reel having a generally horizontal coil-supporting plate and an axially tapered central hub projecting above said plate; a strip of tape of substantially uniform width spirally wound around said hub to form an endless coil on said plate, the tape extending from the innermost to the outermost coil convolution; means for guiding said magazine to an operating position; releasable brake means carried by said magazine including a brake member for engaging the top of the coil to prevent movement thereof, means normally holding said brake member and said coil in engagement, and brake releasing means accessible from outside the magazine; and means for actuating said brake releasing means in response to movement of said magazine to said operating position to free said reel and said coil for rotation during feeding of the tape.

7. A magazine having a reel mounted therein for rotation about an upright axis, said reel comprising a hub and a coil-supporting disk, a strip of tape wound about said hub to form a coil resting on said disk, means for preventing rotation of said coil and said disk including a brake member carried by the magazine for engaging the top of said coil and means carried by the magazine normally holding said brake member and said coil in engagement to prevent rotation of the coil, and means carried by the magazine and operable from outside the magazine for causing the brake member and the coil to separate so that the reel and the coil are free to rotate.

8. A magazine as defined in claim 7 wherein said brake member comprises a spring finger carried by said magazine and normally pressing against said coil.

9. A magazine having a removable cover and a reel mounted in the magazine for rotation about an upright axis, said reel comprising an axially tapered hub and a coil-supporting disc, a strip of endless tape wound about said hub to form a coil resting on said disc, means for preventing rotation of said coil and said disc including a brake member formed by a portion of said cover for engaging the top of said coil and means carried by the magazine biasing the reel upwardly toward said brake member and normally holding said brake member and said coil in engagement to prevent rotation of the coil, and means carried by the magazine for causing the brake member and the coil to separate to free the reel and the coil for rotation.

10. A magazine having a reel mounted therein for rotation about an upright axis, said reel comprising an axially tapered hub and a coil-supporting disc, a strip of endless tape wound about said hub to form a coil resting on said disc, means for preventing rotation of said coil and said disc including a brake member rigidly mounted on the magazine for engaging the top of said coil and means comprising a plastic spring finger molded integrally with the magazine below the coil for pressing the reel upwardly toward the brake member and for normally holding said brake member and said coil in engagement to prevent rotation of the coil, and means carried by the spring finger of said magazine for moving the finger downwardly and for causing the brake member and the coil to separate so that the reel and the coil are free to rotate, said finger normally engaging said reel and serving as a brake to prevent rotation of said reel.

11. A magazine having a reel mounted therein for rotation about a vertical axis, said reel comprising an axially tapered hub and a coil supporting plate rigidly connected to said hub, a strip of magnetic coated plastic tape wound about said hub to form a coil having cylindrical convolutions, releasable means carried by the magazine for preventing accidental rotation of said coil comprising a brake member normally engaging the top of said coil, and a small opening in said magazine permitting access to said releasable means, said magazine completely enclosing the reel so that it can be freed for rotation only through said opening, said brake member comprising a spring finger anchored near said hub and having a generally horizontal coil-engaging portion extending radially outwardly above said coil to the margin of said coil supporting plate and having an upright brake-releasing end portion extending downwardly below said coil-supporting plate, said opening in the bottom portion of the magazine permitting access to said brake-releasing portion.

12. In a tape recording and/or reproducing device, a magnetic head, a pair of feed rollers, the combination of a reel having a generally horizontal coil-supporting plate and an axially tapered central hub projecting above said plate, a removable magazine having means supporting said reel for rotation about a vertical axis and having top, bottom and marginal walls enclosing said reel, a strip of tape of substantaily uniform width spirally wound around said hub to form an endless coil engaging the top of said plate, tape guides in the magazine spaced from the reel for supporting a length of the tape between them while guiding a loop of the tape from the innermost to the outermost convolution of said coil, means for holding the magazine in an operating position wherein said length of tape may engage the feed rollers and the magnetic head, means for causing relative upward and downward movement between one of said feed rollers and said length of tape to position the tape between the feed rollers and for moving the feed rollers against the tape, releasable brake means carried by said magazine including a brake member for engaging the top of said coil to prevent movement thereof and means for holding said brake member and said coil in engagement, means carried by the magazine for releasing the brake member and the coil so that the reel and the coil thereon are free to rotate when the feed rollers move into engagement with the tape, and a small opening in the lower portion of said magazine permitting access to said last-named means from outside the magazine.

13. The combination of claim 12 wherein an opening is provided in said bottom wall and said means for causing relative upward and downward movement swings one of the feed rollers upwardly from a position below the magazine through said last-named opening against the other feed roller to grip the tape and effects release of the brake by the brake releasing means before the feed rollers grip the tape to initiate feeding thereof.

References Cited in the file of this patent

UNITED STATES PATENTS

| | | |
|---|---|---|
| 2,205,052 | Stein | June 18, 1940 |
| 2,661,162 | Owens | Dec. 1, 1953 |
| 2,778,880 | Eash | Jan. 22, 1957 |